United States Patent
Deckers et al.

(10) Patent No.: US 7,850,939 B2
(45) Date of Patent: Dec. 14, 2010

(54) METHOD FOR PRODUCING PRUSSIC ACID

(75) Inventors: Andreas Deckers, Flomborn (DE); Thomas Schneider, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/439,845

(22) PCT Filed: Aug. 28, 2007

(86) PCT No.: PCT/EP2007/058923

§ 371 (c)(1), (2), (4) Date: Mar. 4, 2009

(87) PCT Pub. No.: WO2008/028842

PCT Pub. Date: Mar. 13, 2008

(65) Prior Publication Data

US 2010/0021365 A1 Jan. 28, 2010

(30) Foreign Application Priority Data

Sep. 7, 2006 (EP) .................................. 06120307

(51) Int. Cl.
*C01C 3/02* (2006.01)
(52) U.S. Cl. ...................................... 423/377; 423/373
(58) Field of Classification Search ................. 423/377, 423/373
See application file for complete search history.

(56) References Cited

U.S. PATENT DOCUMENTS

| | | | |
|---|---|---|---|
| 2,723,184 A | 11/1955 | Creighton et al. | |
| 3,702,887 A | 11/1972 | Sennewald et al. | |
| 4,693,877 A | 9/1987 | Oehsen et al. | |
| 4,745,207 A * | 5/1988 | Brunnmueller et al. | 558/351 |
| 7,514,059 B2 * | 4/2009 | Deckers et al. | 423/373 |
| 2006/0110309 A1 | 5/2006 | Babler et al. | |
| 2007/0231239 A1 | 10/2007 | Deckers et al. | |

FOREIGN PATENT DOCUMENTS

| | | |
|---|---|---|
| DE | 973 173 | 12/1959 |
| DE | 101 38 553 | 5/2003 |
| EP | 0 209 039 | 1/1987 |
| GB | 1 295 379 | 11/1972 |
| WO | 2004 050587 | 6/2004 |
| WO | 2006 027176 | 3/2006 |

* cited by examiner

*Primary Examiner*—Timothy C Vanoy
*Assistant Examiner*—Michelle Hou
(74) *Attorney, Agent, or Firm*—Oblon, Spivak, McClelland, Maier & Neustadt, L.L.P.

(57) ABSTRACT

Process for preparing hydrocyanic acid, which comprises catalytic dehydration of gaseous formamide to give a product mixture comprising hydrocyanic acid, water, formamide, ammonia, CO and high boilers, separation of the product mixture by condensation of a condensate comprising water, formamide, high boilers and possibly ammonia and hydrocyanic acid from the product mixture obtained and partial or total recirculation of the condensate into a heat exchanger located downstream of the reactor.

8 Claims, No Drawings

METHOD FOR PRODUCING PRUSSIC ACID

The present invention relates to a process for preparing hydrocyanic acid, which comprises catalytic dehydration of gaseous formamide to give a product mixture comprising hydrocyanic acid, water, formamide, ammonia, CO and high boilers, separation of the product mixture by condensation of a condensate comprising water, formamide, high boilers and possibly ammonia and hydrocyanic acid from the product mixture obtained and partial or total recirculation of the condensate into a heat exchanger located down-stream of the reactor.

Hydrocyanic acid is an important basic chemical which is used as starting material in, for example, numerous organic syntheses such as the preparation of methacrylic esters, lactic acid and metal cyanides, as polyamide precursor, for the preparation of pharmaceutical and agrochemical products, in mining and in the metallurgical industry.

An important process for the industrial preparation of hydrocyanic acid is thermal dehydration of formamide under reduced pressure, which proceeds according to equation (I) below:

$$HCONH_2 \rightarrow HCN + H_2O \quad (I)$$

This reaction is accompanied by decomposition of formamide according to equation (II) to form ammonia and carbon monoxide:

$$HCONH_2 \rightarrow NH_3 + CO \quad (II)$$

The ammonia formed catalyzes the polymerization of the desired hydrocyanic acid and thus leads to impairment of the quality of the hydrocyanic acid and a reduction in the yield of the desired hydrocyanic acid.

In the preparation of hydrocyanic acid, formation of carbon black occurs in the reactor; this can be suppressed by addition of small amounts of oxygen in the form of air, as disclosed in EP-A 0 209 039. EP-A 0 209 039 discloses a process for the thermolytic dissociation of formamide over highly sintered shaped aluminum oxide or aluminum oxide/silicon dioxide bodies or over shaped high-temperature-corrosion-resistant chromium-nickel stainless steel bodies. The formamide conversion is not complete in this process. To increase the total formamide conversion, separation and recirculation of unreactive residual formamide is thus useful.

DE-A 101 38 553 relates to a process for preparing hydrocyanic acid by catalytic dehydration of gaseous formamide in the presence of a catalyst comprising iron in the form of metallic iron and/or iron oxide. In particular, the catalyst is selected from among packings comprising steel and iron oxides on a support material comprising aluminum oxide.

WO 2004/050587 discloses a process for preparing hydrocyanic acid by catalytic dehydration of formamide, in which the reactor has an interior reactor surface composed of a steel comprising iron and also chromium and nickel. The reactor used in the process of WO 2004/050587 preferably comprises no additional internals.

WO 2006/027176 relates to a process for preparing hydrocyanic acid by catalytic dehydration of gaseous formamide, in which a recycle stream comprising formamide is separated from the product mixture from the dehydration and is recirculated to the dehydration, with the recycle stream comprising from 5 to 50% by weight of water. According to WO 2006/027176, a mixture of water, formamide, high boilers and dissolved gases is preferably condensed out as condensate 1 from the product gas mixture from the dehydration, part of the water and the dissolved gases are separated off from the condensate 1 to give a condensate 3 comprising water, formamide and high boilers and the formamide-comprising recycle stream is separated off from the condensate 3 by simple distillation.

In the separation of unreacted formamide and of water of reaction from the raw gas, the gas is cooled and formamide together with part of the water are condensed out. Heat exchangers, e.g. shell-and-tube heat exchangers, located downstream of the reactor are used for this purpose. At the places at which condensed phases are formed, deposition of solids, e.g. comprising polymeric HCN, occurs every now and again. As a consequence, the process for preparing HCN has to be interrupted at regular intervals and the coated apparatuses have to be cleaned. This state results in a stoppage of production, which leads to tremendous economic damage.

It is therefore an object of the present invention to provide a process for preparing hydrocyanic acid by catalytic dehydration of formamide which is simple to carry out and has a high availability and short shutdown times.

This object is achieved by a process for preparing hydrocyanic acid, which comprises i) catalytic dehydration of gaseous formamide in a reactor having a downstream heat exchanger having condensation surfaces to give a product mixture comprising hydrocyanic acid, water, formamide, ammonia, CO and high boilers;

ii) partial condensation of a liquid phase comprising formamide and water from the product mixture, iii) continuous recirculation of part of the condensed-out liquid and pumping of this condensed-out liquid back onto the condensation surfaces of the heat exchanger.

Two effects are achieved in this way: firstly, the inflowing hot process gas is cooled (quenched), for example from about 450° C. to about 250° C., and, secondly, the HCN polymer formed on the condensation surfaces of the heat exchanger is regularly rinsed off the heat exchanger surfaces by the partial recirculation of the condensed-out liquid (condensate). Caking or blockage of the reactor by deposits on the heat exchanger surfaces can thus be delayed or virtually completely prevented by means of the process of the invention.

The recirculated condensate is preferably distributed as uniformly as possible over the condensation surfaces of the heat exchanger. This can be achieved by the condensate being fed onto the condensation surface at one or more points. The feeding of the condensate onto the condensation surfaces of the heat exchanger is preferably effected by pumping the condensate by means of pumps onto the condensation surfaces of the heat exchanger. In an embodiment of the process of the invention, the condensate is pumped onto the inlet point of the heat exchanger. The preferred point of addition is thus selected so that the parts of the heat exchanger at which the phase transition gas/liquid takes place are continually surrounded by flowing liquid. The distribution of the condensate over the condensation surfaces of the heat exchanger occurs, in a preferred embodiment of the process of the invention, by means of one or more nozzles which are generally located in different places. As a result, the recirculated condensate is distributed finely and uniformly.

In a preferred embodiment, the total condensation surfaces of the downstream heat exchanger are continually wetted with liquid. The ratio of recirculated condensate and raw gas (in proportions by mass) is generally from 1:2 to 1:20, preferably from 1:3 to 1:15 and particularly preferably from 1:3 to 1:10.

Step i)

In step i) of the process of the invention, catalytic dehydration of gaseous formamide takes place.

Suitable catalysts are all known catalysts suitable for the dehydration of gaseous formamide. Examples of suitable catalysts are highly sintered shaped bodies made up of from 50 to 100% by weight, preferably from 85 to 95% by weight, of aluminum oxide and from 0 to 50% by weight, preferably from 5 to 15% by weight, of silicon dioxide and also shaped chromium-nickel stainless steel bodies as described in EP-A 0 209 039, packing comprising steel and/or iron oxide on a support material, as described in DE-A 101 38 553. Furthermore, the inside of the wall of the reactor can be made of steel, for example V2A steel, and serve as catalyst. It is not necessary for the reactor to comprise further internals. A suitable reactor in which the reactor wall serves as catalyst is, for example, an empty tube reactor comprising V2A steel, with the hot surface of the tube walls serving as catalyst. Suitable reactors are described in WO 2004/050587.

In step (i) of the process of the invention, the gaseous formamide can be reacted in the presence of atmospheric oxygen. It is usual to use from 0 to 10 mol % of atmospheric oxygen, based on the amount of formamide used, preferably from 0.1 to 10 mol %, particularly preferably from 0.5 to 3 mol %, of atmospheric oxygen.

The temperature in step i) of the process of the invention is generally from 350 to 650° C., preferably from 400 to 600° C., particularly preferably from 450 to 550° C., very particularly preferably from 500 to 550° C.

Step i) of the process of the invention is generally carried out under reduced pressure, below atmospheric pressure, preferably at a pressure of from 70 to 350 mbar, particularly preferably from 80 to 200 mbar.

Step i) of the process of the invention can in principle be carried out in any reactor. Preference is given to using a tube reactor, particularly preferably a multitube reactor. Suitable tube reactors are known to those skilled in the art.

The gaseous formamide used in step i) is usually obtained by vaporizing liquid formamide under a reduced pressure of generally from 1 to 350 mbar, preferably from 80 to 250 mbar, and a temperature of generally from 100 to 300° C., preferably from 130 to 220° C., in the heat exchanger, preferably a shell-and-tube heat exchanger, fine film evaporator or thin film evaporator. The formamide vapor is subsequently brought to the reaction temperature in the actual dehydration reactor or in an additional upstream heat exchanger.

The mean residence time of the catalyst in step i) of the process of the invention is generally from 0.01 to 0.5 s, preferably from 0.05 to 0.2 s.

In step i), a product mixture comprising hydrocyanic acid, water, unreacted formamide, ammonia, CO and high boilers is obtained. In the context of the present patent application, high boilers are, in particular, polymers such as polymeric HCN and diformamide and salts, e.g. ammonium cyanide.

Suitable downstream heat exchangers are heat exchangers which are suitable for condensing a liquid comprising formamide and water from the product mixture obtained in step i). Examples of suitable heat exchangers are shell-and-tube heat exchangers, plate heat exchangers, Thermoblechs, etc.

Step ii)

The catalytic dehydration in step i) is followed by condensation of a liquid, comprising formamide and water (condensate) from the abovementioned product mixture. The condensate generally comprises water, formamide, high boilers and possibly ammonia and hydrocyanic acid. Ammonia and hydrocyanic acid are generally present in the condensate in only small amounts of <0.5% by weight. Furthermore, a gaseous product stream which generally comprises hydrocyanic acid, water, ammonia and CO is obtained in the condensation.

The amount of condensed liquid obtained in the partial condensation (based on the total mass flow of process gas) is generally from 1 to 20% by weight, preferably from 3 to 15% by weight and particularly preferably from 5 to 10% by weight.

The condensation in step ii) of the process of the invention preferably takes place in such a way that the product mixture formed in step i), which generally has a temperature of from 400 to 600° C., is cooled to from 10 to 150° C. This cooling is generally carried out in one or more heat exchangers or in a quenching column.

The gaseous product stream generally comprises hydrocyanic acid, water, ammonia and CO and serves for isolation of the desired hydrocyanic acid. In a preferred embodiment, ammonia is removed by extraction, for example by absorption in sulfuric acid, and hydrocyanic acid is subsequently obtained as condensate 2. The hydrocyanic acid can subsequently be purified further, for example by fractional distillation.

Step iii)

In step iii), part of the condensed-out liquid is, according to the invention, continuously recirculated and pumped back onto the condensation surfaces of the heat exchanger.

In general, the proportion of the condensed-out liquid which is recirculated is such that the ratio of recirculated condensate to raw gas (in proportions by mass) is from 1:2 to 1:20, preferably from 1:3 to 1:15 and particularly preferably from 1:3 to 1:10.

Long operation times of generally at least six months can be achieved by means of the process of the invention. The process of the invention thus serves to reduce the purification costs and to shorten downtimes of a plant for preparing hydrocyanic acid. The following examples illustrate the invention.

EXAMPLES

Example 1

According to the Invention

A 4.5 m long reaction tube made of 1.4541 steel (V2A steel) and having an internal diameter of 10 mm and an external diameter of 12 mm is brought to a constant external temperature of 520° C. by electric heating. The reaction tube has a specific surface area of 400 $m^2/m^3$. The internal pressure in the tube is 150 mbar abs. and is produced by means of a vacuum pump.

In an upstream heat exchanger (vaporizer) which is likewise under the reaction pressure, 1.3 kg/h of formamide are vaporized at 155° C. and conveyed to the top of the reaction tube. In addition, 13 standard l of air/h are fed in at the connection between the heat exchanger and the reaction tube.

At the end of the reaction tube, there is a shell-and-tube heat exchanger which cools the process gas in a single stage to 80° C. The cooling water temperature is 23° C.

This procedure forms 0.11 kg per hour of a condensate 1 comprising 67% by weight of formamide, 32% by weight of water, 0.1% by weight of $NH_3$ and about 0.3% by weight of HCN. This condensate 1 is pumped by means of a circulation pump (0.5 kg/h) to the inlet of the heat exchanger. After a continuous running time of 14 days, the apparatus is opened and no polymer deposit is found in the heat exchanger. All tubes are free.

Example 2

Comparative Experiment

A 4.5 m long reaction tube made of 1.4541 steel (V2A steel) and having an internal diameter of 10 mm and an external diameter of 12 mm is brought to a constant external temperature of 520° C. by electric heating. The reaction tube has a specific surface area of 400 m$^2$/m$^3$. The internal pressure in the tube is 150 mbar abs. and is produced by means of a vacuum pump.

In an upstream heat exchanger (vaporizer) which is likewise under the reaction pressure, 1.3 kg/h of formamide are vaporized at 155° C. and conveyed to the top of the reaction tube. In addition, 13 standard l of air/h are fed in at the connection between the heat exchanger and the reaction tube.

At the end of the reaction tube, there is a shell-and-tube heat exchanger which cools the process gas in a single stage to 80° C. The cooling water temperature is 23° C.

Recirculation of condensate as in the example according to the invention is not carried out. After a continuous running time of 9 days, the apparatus had to be opened since an HCN polymer deposit blocked the heat exchanger.

The invention claimed is:

1. A process for preparing hydrocyanic acid, comprising:
   i) catalytically dehydrating gaseous formamide in a reactor to obtain a product mixture stream comprising hydrocyanic acid, water, unreacted formamide, ammonia, CO and high boilers;
   ii) condensing a liquid phase comprising the unreacted formamide and water from the product mixture stream in a heat exchanger having condensation surfaces located downstream from the dehydration reactor;
   iii) continuously recirculating a part of the condensed liquid comprising water and unreacted formamide to the heat exchanger; and
   iv) pumping the recirculated liquid part onto the condensation surfaces of the heat exchanger.

2. The process according to claim 1, wherein the recirculated condensed liquid part is pumped onto the condensation surfaces of the heat exchanger at one or more points.

3. The process according to claim 1, wherein the recirulated liquid part pumped onto the condensation surfaces continuously wets the entire condensation surfaces of the downstream heat exchanger.

4. The process according to claim 1, wherein
   a catalyst for the dehydration in i) is at least one selected from the group consisting of highly sintered shaped bodies comprising from 50 to 100% by weight of aluminum oxide and from 0 to 50% by weight of silicon dioxide, shaped chromium-nickel stainless steel bodies, and packings comprising at least one of steel and iron oxide on a support material, and
   the reactor inside wall comprises steel.

5. The process according to claim 1, wherein i) is carried out in the presence of atmospheric oxygen.

6. The process according to claim 1, wherein i) is carried out at a temperature of from 350 to 650° C.

7. The process according to claim 1, wherein i) is carried out at a pressure of from 70 to 350 mbar.

8. The process according to claim 1, wherein the condensation in ii) is effected by cooling the product mixture formed in i) to from 10 to 150° C.

* * * * *